April 5, 1966 E. J. SAUR 3,244,490
SUPERCONDUCTOR
Filed Sept. 10, 1963
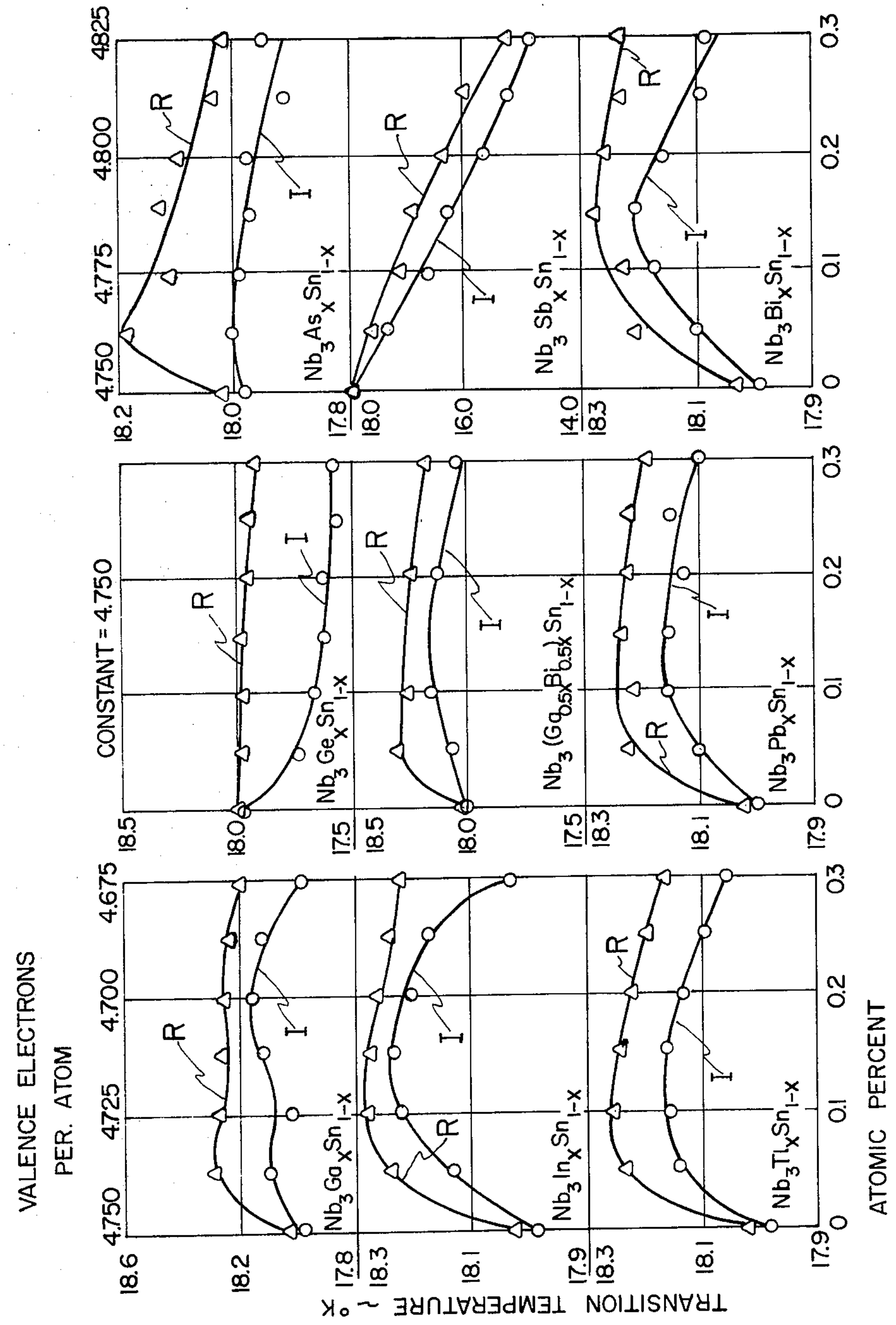

United States Patent Office 3,244,490

Patented Apr. 5, 1966

3,244,490

SUPERCONDUCTOR

Eugen J. Saur, Giessen, Germany, assignor to National Research Corporation, Cambridge, Mass., a corporation of Massachusetts Filed Sept. 10, 1963, Ser. No. 307,896
3 Claims. (Cl. 29—194)

This application is a continuation-in-part of my copending applications S.N. 208,925, filed July 10, 1962, for "Method of Making Superconductor Devices," and S.N. 233,961, filed October 29, 1962, for "Process and Product."

The present invention relates to the superconductive compound having the formula $Nb_3Sn$. This compound has the highest transition temperature of known superconductors, about 18° K. in most literature references and as high as 18.15 K. where complete homogeneity is achieved, as taught in the U.S. Patent 3,084,041, to Zegler et al.

It has been predicted that higher transition temperature compounds can be achieved by changing the number of valence electrons per atom of the $Nb_3Sn$ (Matthias: Progress in Low Temperature Physics II, p. 138, Amsterdam, 1957). However, this prediction does not afford a basis for improving $Nb_3Sn$ since there is no practical technique for changing the valence electron number without making a corresponding change in density or the like, which may affect the superconductive characteristics adversely.

The principal object of the invention is to provide new compositions of matter which will have higher transition temperatures than any material heretofore tested.

It is a related object to increase the transition temperature $Nb_3Sn$ by substituting selected materials for the tin content thereof.

It is a further object to provide improved superconducting articles which can be maintained superconductive at higher temperatures.

It is a further object to provide improved superconducting articles with higher field tolerances at elevated temperatures approaching that of liquid hydrogen at atmospheric pressure.

It is a further object to improve the critical current characteristics of $Nb_3Sn$ by selective addition of materials thereto.

Other objects of the invention will in part be obvious and will in part appear hereinafter.

The invention accordingly comprises a superconductive composition of matter and articles which can be fabricated from such composition with improved properties compared to articles fabricated from $Nb_3Sn$ composition.

The single figure of drawings is a collection of curves showing transition temperature as a function of substitution of an element or elements for the tin component of $Nb_3Sn$.

The curves are arranged with substituents selected from Group III of the Periodic Table in the left hand column, substituents from Group IV in the center column and substituents from Group V in the right hand column. Critical temperature is the temperature at which the resistance ratio of a sample (measured resistance divided by normal state resistance) is 0.5.

*Example*

Elemental powders of niobium, tin and gallium of high purity (all in excess of 99.9%) were mixed in atomic proportions of $Nb_3Sn_{1-x}Ga_x$ where $x$ was varied for different samples. Each sample mixture was pressed, at 8 tons per sq. cm., into a small pellet and heated at 1200° C. for 6 hours. The heating was carried out in a sealed off quartz tube held in a furnace. The interior of the tube is evacuated to $10^{-4}$ mm. Hg abs. The transition temperature of the samples (temperature at which resistance is reduced by one half) was measured by resistive techniques and by inductive techniques, known in the art. The results of these tests are shown in the curves of the drawings where curve R shows the results of resistance measurements and curve I shows the results of inductive measurements $\lambda$ being .05, .1, .15, .2, .25 and .3 in the different samples. The experiment was repeated using indium, thallium, lead, germanium, antimony, arsenic, bismuth and a mixture of gallium and bismuth as substituents.

Observation of the curves shows that changing the number of valence electrons per atom does not necessarily give a predictable improvement in superconductivity. As shown in the curves, replacement of tin by germanium decreases superconductivity, even though the number of valence electrons per atom is held constant at 4.750. Increasing the valence electron number by antimony additions decreases superconductivity.

The resistive transition can be exhibited even if only a small portion of the sample goes through the superconducting transition. On the other hand the inductive transition is indicative of the behavior of the whole sample and therefore equal to or lower than the corresponding resistance measurements.

It is therefore determined experimentally that replacement of the tin content of $Nb_3Sn$ by selected amounts of a metal selected from the group consisting of Ga, In, Tl, Pb and Bi, and mixtures thereof improves the superconductive transition of the alloy. The principal utility of these new alloys is in fabricating components for superconducting electromagnets and bistable devices. For instance, a niobium wire can be dipped into a molten bath of Sn .85 In .15 alloy and treated in the manner disclosed in my above copending application S.N. 233,961, to form the compound $Nb_3Sn$ .85 In .15 as a thin diffusion coating on the wire. The coated wire can be maintained superconductive at temperatures higher than those at which a $Nb_3Sn$ coated niobium wire can be maintained superconductive.

All samples of the examples described above were heated at 1200° C. for 6 hours. Experiments have shown that greater homogeneity may be achieved for the new compositions by variation of time and temperature in certain cases. However 1200° C. for 6 hours is a good average heat cycle for all the compositions. Improved homogeneity would slightly raise the critical temperature-composition curves shown in the drawings.

What is claimed is:

1. A composition of matter having the formula $$Nb_3Me_xSn_{1-x}$$

wherein Me is one or more metals selected from the group consisting of Ga, In, Tl, Pb, Bi, and wherein $x$ varies from .025 to 0.25, the composition having a superconducting transition temperature, as determined by inductive measurements, in excess of the transition temperature of $Nb_3Sn$.

2. A superconductor comprising a coated substrate, the substrate having a lower superconducting transition than the coating and the coating comprising a composition of the formula $Nb_3Me_xSn_{1-x}$ wherein Me is one or more metals selected from the group consisting of Ga, In, Tl, Pb, Bi, and wherein $x$ varies from .025 to 0.25, the coating having a superconducting transition temperature as determined by inductive measurements in excess of the transition temperature of $Nb_3Sn$.

3. The coated substrate of claim 2 wherein the substrate is niobium and the coating is secured thereto by a diffusion bond.

References Cited by the Examiner

UNITED STATES PATENTS 3,181,936 5/1965 Denny et al. ---------- 29—194

HYLAND BIZOT, *Primary Examiner.*